US005551807A

United States Patent [19]
Breaux

[11] Patent Number: 5,551,807
[45] Date of Patent: Sep. 3, 1996

[54] IN-GROUND BARRIER SYSTEM

[76] Inventor: Louis B. Breaux, 2521 Fawnwood Rd., Marrero, La. 70072

[21] Appl. No.: 320,431

[22] Filed: Oct. 6, 1994

Related U.S. Application Data

[63] Continuation-in-part of Ser. No. 986,241, Dec. 4, 1992, and Ser. No. 93,524, Jul. 19, 1993, Pat. No. 5,354,149, each is a continuation-in-part of Ser. No. 831,555, Feb. 5, 1992, Pat. No. 5,240,348, which is a continuation of Ser. No. 398,613, Sep. 25, 1989, Pat. No. 5,106,233.

[51] Int. Cl.$^6$ .......................... E02D 27/00; E02D 29/02
[52] U.S. Cl. ..................................... 405/267; 405/274
[58] Field of Search .................................. 405/258, 262, 405/266, 267, 274, 278, 281, 128, 129

[56] References Cited

U.S. PATENT DOCUMENTS

| | | | |
|---|---|---|---|
| 4,741,644 | 5/1988 | Cavalli et al. | 405/267 X |
| 4,844,662 | 7/1989 | Kallinich et al. | 405/267 X |
| 4,909,674 | 3/1990 | Konno et al. | 405/267 |
| 4,927,297 | 5/1990 | Simpson | 405/267 X |
| 5,010,776 | 4/1991 | Lucero et al. | 73/863.23 |
| 5,259,705 | 11/1993 | Breaux et al. | 405/274 X |
| 5,302,054 | 4/1994 | Winkler et al. | 405/274 |
| 5,354,149 | 10/1994 | Breaux | 405/267 X |
| 5,423,637 | 6/1995 | Taki | 405/267 |

*Primary Examiner*—Frank Tsay
*Attorney, Agent, or Firm*—Joseph T. Regard, Ltd.

[57] ABSTRACT

A hazardous waste barrier system for preventing the generally lateral, subterranean migration of certain fluid substances (including both liquid and gaseous fluids) beyond an established perimeter, while providing controlled collection of same for monitoring or disposal. The present system utilizes a barrier wall, which may be formed in-ground via horizontally rolled plastic sheeting or slidingly or otherwise engaged panels. The present system may be configured to intersect the flow path of the substance to be contained, and may be configured with additional systems to enhance containment or collection of the fluid. In use, the barrier of the present invention is installed by first making an excavation to accommodate the barrier system, and the excavation and barrier wall is implemented to a depth so as to allow for the interception with the established or anticipated migration path of the substance to be contained or collected, and/or processed.

14 Claims, 11 Drawing Sheets

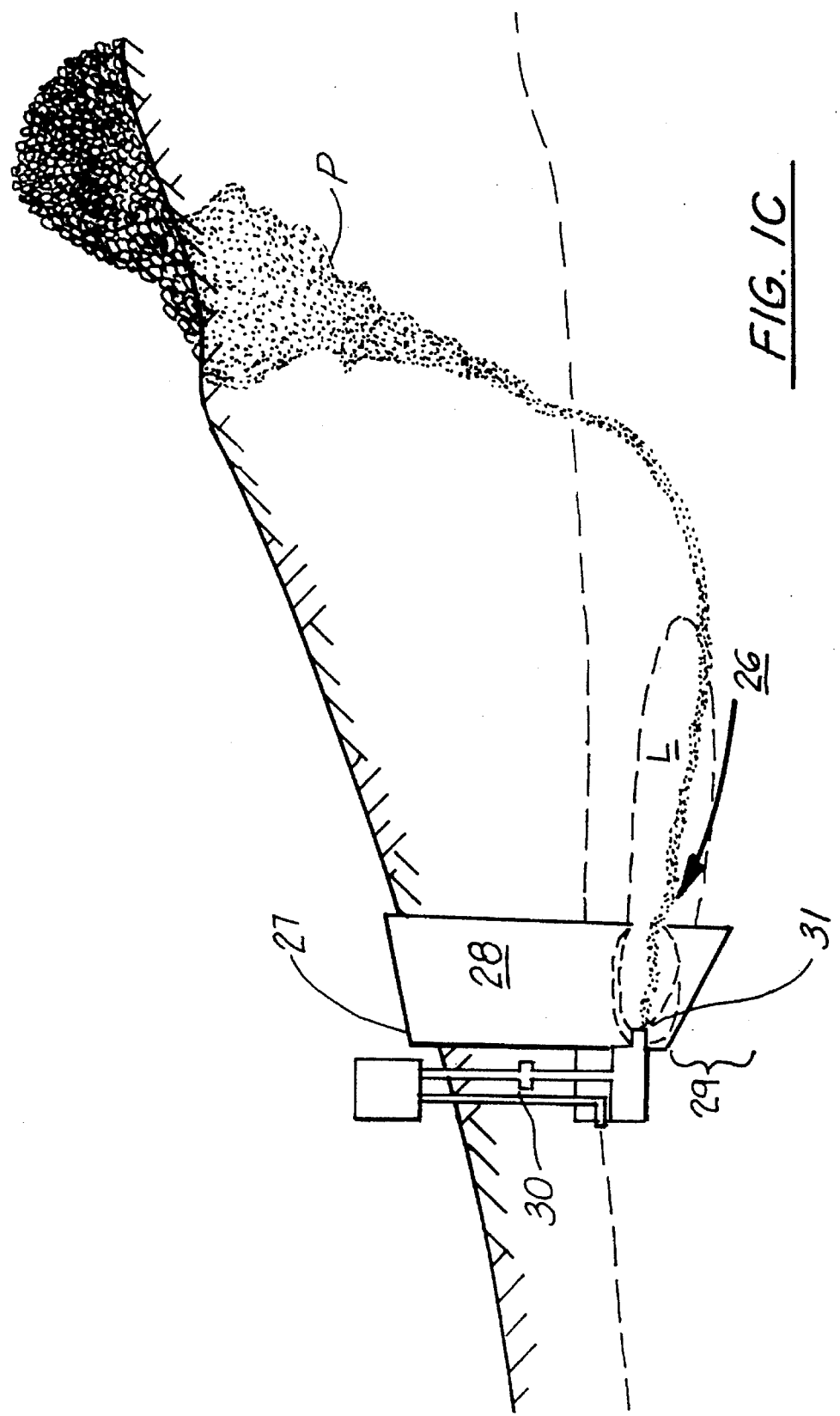
FIG. IC

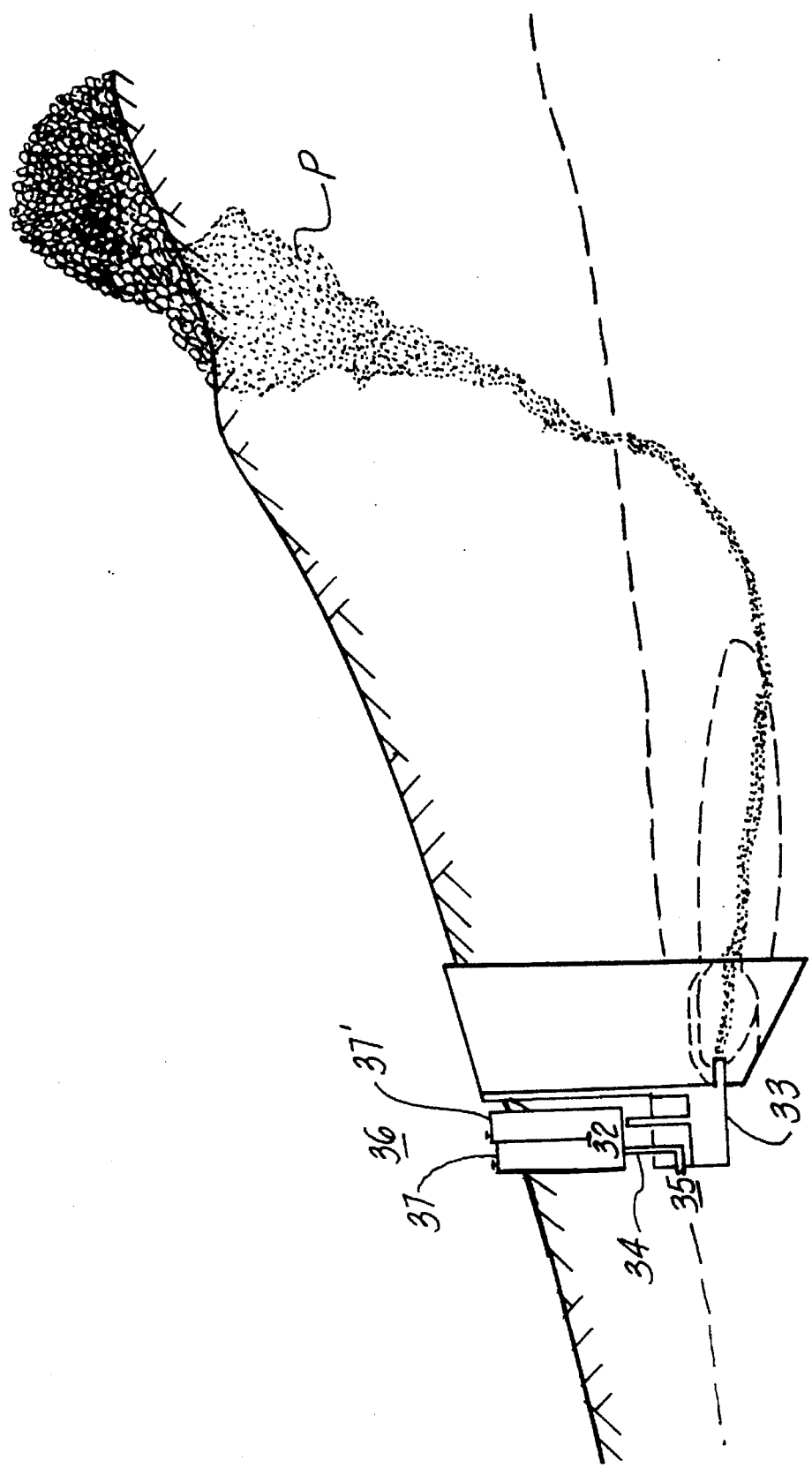
FIG. ID

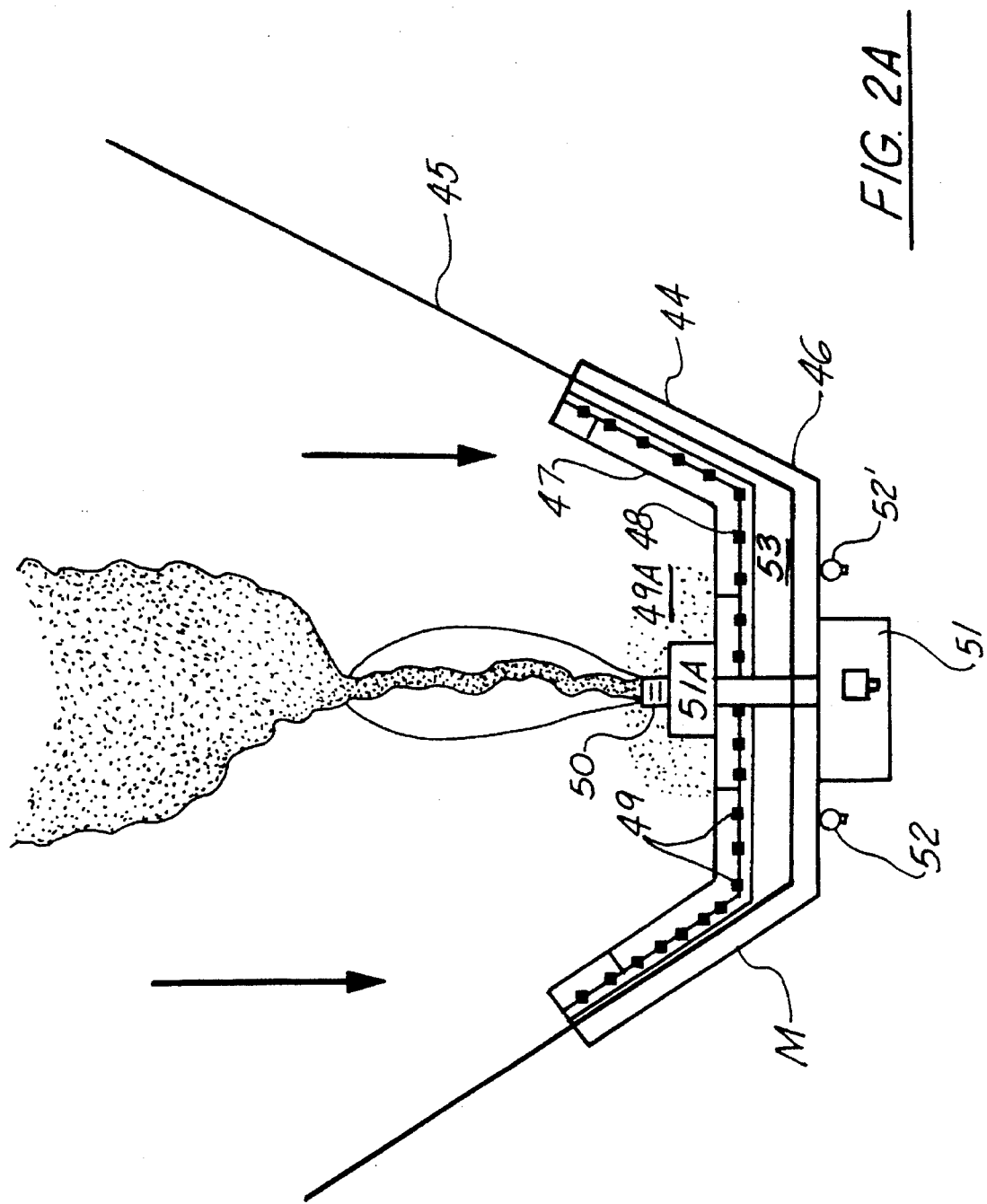

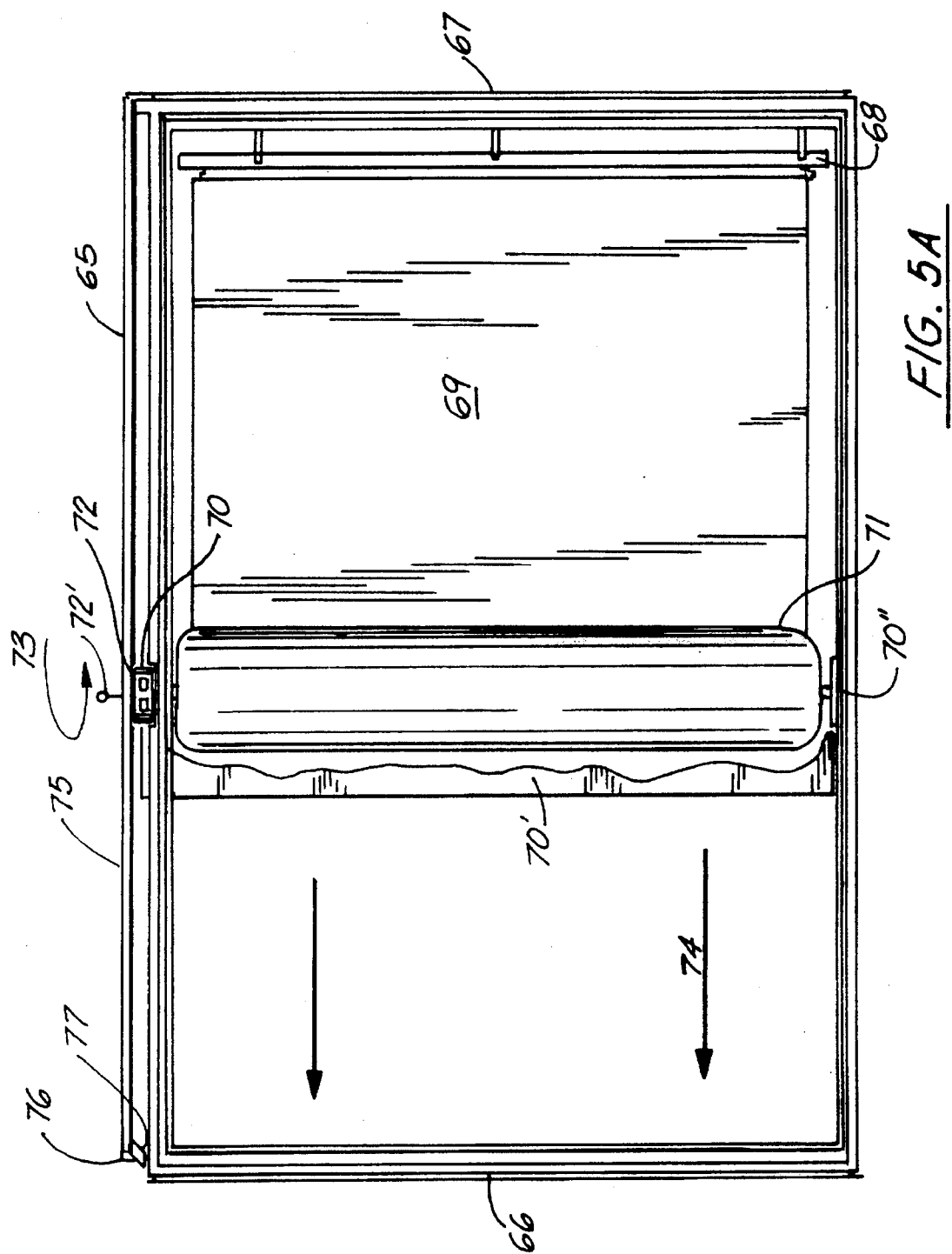

IN-GROUND BARRIER SYSTEM

REFERENCE TO RELATED APPLICATIONS

The present application is a continuation-in-part of the following applications:

Ser. No. 07/986,241, listing Louis B. Breaux and Leonard F. Sansone as inventors, having a filing date of Dec. 4, 1992, entitled "In Ground Barrier Member Joint and Seal System", which is a continuation-in-part of Ser. No. 07/831,555, entitled "Methods of Hazardous Waste Containment", listing inventor Louis Breaux, having an filing date of Feb. 5, 1992, which issued as U.S. Pat. No. 5,240,348 on Sep. 31, 1993, which patent in turn is a continuation of application Ser. No. 07/398,613 listing inventor Louis Breaux, having a filing date of Sep. 25, 1989, which issued as U.S. Pat. No. 5,106,233 on Sep. 21, 1992, the disclosures of which applications are all incorporated herein by reference; and Ser. No. 08/093,524, listing Louis B. Breaux as inventor, having a filing date of Jul. 19, 1993, entitled "In-Ground Barrier System with Pass-Through", issuing as U.S. Pat. No. 5,354,149 on Oct. 11, 1994, which is indicated as a continuation-in-part of Ser. No. 07/831,555, entitled "Methods of Hazardous Waste Containment", listing inventor Louis Breaux, having an filing date of Feb. 5, 1992, which issued as U.S. Pat. No. 5,240,348 on Sep. 31, 1993, which patent in turn is a continuation of application Ser. No. 07/398,613 listing inventor Louis Breaux, having a filing date of Sep. 25, 1989, which issued as U.S. Pat. No. 5,106,233 on Sep. 21, 1992, the disclosures of which applications are all incorporated herein by reference.

BACKGROUND OF THE INVENTION

Invention Field

The present invention relates to in-ground barriers, and more particularly to a hazardous waste barrier system for preventing the generally lateral, subterranean migration of certain fluid substances (including both liquid and gaseous fluids, as well as non-fluid particulates conveyed therewith) beyond an established perimeter, while providing the capability of controlled collection of said fluids for monitoring, treatment, or disposal.

The present system utilizes a barrier, which may be formed in-ground, for example, via vertically situated, horizontally rolled, fluid impermeable sheeting.

The present system may be configured to allow the interception, collection, or monitoring of the flow path of the substance to be contained, and may be configured with additional systems to enhance containment or collection of the fluid. Such an additional system is disclosed, teaching a pass-through conduit at a pre-designated point or points in the barrier wall for providing a collection area, which collection area may further include a suction system for establishing a low pressure area for drawing the desired fluid thereto.

In use, the barrier of the present invention is installed by first making an excavation to accommodate the barrier system, the excavation and barrier wall implemented to a depth so as to allow the interception of the established or anticipated migration path of the fluid to be contained or collected.

Installation of interconnected, vertical guide boxes to facilitate installation of an in-ground, sealed containment or restriction wall and/or collection system or the like may be implemented to facilitate an excavation of a sufficient depth for installation of the barrier, while preventing caving in of the side walls of the excavation. Once the barrier and/or collection system is installed, the open area adjacent to both sides of the barrier may be back filled and the guide box assembly may be removed, or said guide box may remain, for providing structural integrity to the system.

The present system is particularly suitable for providing a barrier for preventing the further flow of fluids having a lower specific gravity than water. In such a system, a trench would be excavated to a point below the water table, effectively blocking further passage of any fluids above the water line. This alternative embodiment further may include suction means incorporated with the pass-through conduit to provide a low pressure area, drawing the water table upward, and allowing for enhanced containment and/or fluid sampling or removal.

BACKGROUND ART

As may be determined by a review of the below cited patents, the prior art has failed to contemplate a system as taught in the present invention. Further, the patents cited below are fully distinguishable in construction and use, and are cited only as being at best remotely pertinent to the claimed invention.

A list of prior patents which may be of interest is presented below:

| U.S. Pat. No. | Patentee(s) | Issue Date |
|---|---|---|
| 2,101,285 | Stevens | 12/07/1937 |
| 2,937,065 | L. Harza | 05/17/1960 |
| 2,961,731 | Buzzell et al | 11/29/1960 |
| 3,202,412 | Hunsucker | 02/07/1967 |
| 3,411,305 | A. Cella | 11/19/1968 |
| 3,848,855 | Weiland | 11/19/1974 |
| 3,886,705 | Cornland | 06/03/1975 |
| 4,808,039 | Fischer | 02/28/1989 |

A cursory review of the above cited patents shows that the prior art is indeed clearly distinguishable from and does not make "obvious" the present invention. Indeed most, if not all, of the cited patents are not part of the prior art of the invention but rather are from disparate, non-analogous arts.

U.S. Pat. No. 2,101,285 teaches a "tubular interlocking piling" of steel having interlocking structures incorporated therewith. The specification teaches the system as being used in the construction or reinforcement of coffer dams, bridge piers and the like. It is noted that the apparatus does not contemplate the utilization of a containment structure, although it does teach implementation as a support wall for above ground construction. Further, unlike the present invention, sealing means for preventing fluid migration is not taught.

U.S. Pat. No. 3,302,412 to Hunsucker teaches "interlocking sheet piles and method of installation", including means to slidingly engage and seal the sheet piles. The system is likewise obviously distinguishable from the present invention, for a variety of reasons.

The lugs 30 (FIG. 2) as taught in the 412 patent render the system unworkable in terms of taking away the tolerance necessary for slidingly engaging the panels. The tolerance or gap between the shoe and cavity is needed to allow a smooth installation. Lastly, the construction is overly costly and highly impractical, with the necessity of multiple apertures to both cavities, the removal and replacement of the feed tube at each driven pile, and the implementation of scrapers as taught in the specification in the field would be very difficult and time consuming. Thus, even if the system works as taught, it would be usable only with extreme cost and complexity of fabrication.

U.S. Pat. No. 3,886,705 to Cornland teaches a "Hollow Structural Panel of Extruded Plastics Material and a Composite Panel Structure Formed Thereof". The patent teaches a hollow structural panel configured to form partition walls or the like and is designed for resisting deformation due to load bearing. While the '705 patent does teach the utilization of a rubber gasket for preventing leakage of snow, rain, or the like, this apparatus is unsuitable for utilization in conjunction with the system of the present invention. Apparently, the system of the '705 patent would require complete fabrication above ground prior to installation, which would make the system unsuitable for use with the preferred method of the present invention.

U.S. Pat. Nos. 2,937,065 and 2,961,731 disclose fluid impermeable gasket systems fully distinguishable in use, method and apparatus from the present invention.

Not found during the patent search, but known to applicants, is an apparently unpatented method for containing hazardous waste. This present method of preventing the leaching of contaminated fluids from hazardous waste sites comprises the implementation of a "slurry" wall around the site. A trench is dug to a sufficient depth to contact a fluid impermeable natural earth strata, such as clay.

A problem with preparing such a trench, however, relates to the soils' cohesive strength and its propensity for "caving". This system therefore often has had to resort to expensive sheet pilings to retain and strengthen the trench walls. As the sheet pilings typically were insufficient to prevent seepage of the containment therethrough, a still more expensive medium, typically bentonite, a naturally occurring clay, was used to fill the trench. This slurry would solidify, forming a fluid impermeable subterranean "dam" for containment.

The present invention is anticipated to cost substantially less than the most cost efficient slurry wall system, as it does not require sheet pilings or any other means of preventing "caving" because the present invention provides a series of guide box assemblies that create a temporary, isolated work space for the insertion and joining of the barrier members.

Other material costs of the present system are likewise significantly less, requiring as little as one-one-hundredth (1/100) of the amount of bentonite. It is noted that the bentonite costs fluctuate, but may run as high as two hundred ($200.00) dollars per ton including freight (freight on board) job site.

Likewise, the present invention does not require the utilization of piling equipment, heavy lift equipment, or extensive labor, as is necessary for implementation of the above system. Instead, no piling equipment, and only relatively available lifters and less extensive labor is needed.

Some additional patents are listed below:

| U.S. Pat. No. | Patentee(s) | Issue Date |
| --- | --- | --- |
| 1,007,718 | J. I. McGill | 11/07/11 |
| 1,713,675 | R. L Parish | 05/21/29 |
| 1,937,758 | F. R. Harris | 12/05/33 |
| 2,355,102 | O. R. Odman | 08/08/44 |
| 3,302,412 | W. A. Hunsucker | 02/07/67 |
| 3,479,827 | A. R. S. Morrice | 11/25/69 |

-continued

| U.S. Pat. No. | Patentee(s) | Issue Date |
| --- | --- | --- |
| 3,593,528 | J. R. Pavese | 07/20/71 |
| 3,864,921 | Marx et al | 02/11/75 |
| 4,059,964 | Pavese | 11/29/77 |
| 4,090,365 | Nieber | 05/23/78 |
| 4,145,891 | Krings | 03/27/79 |
| 4,194,855 | Egger | 03/25/80 |
| 4,259,028 | Cook | 03/31/81 |
| 4,407,612 | van Weele | 10/04/83 |
| 4,453,861 | Bretz et al | 06/12/84 |
| 4,484,835 | van Klinken | 11/27/84 |
| 4,519,729 | Clarke, Jr. et al | 05/28/85 |
| 4,537,536 | Tsubonuma et al | 08/27/85 |
| 4,607,981 | van Klinken | 08/26/86 |
| 4,657,442 | Krings | 04/14/87 |
| 4,659,260 | Morelli | 04/21/87 |
| 4,664,560 | Cortlever | 05/12/87 |
| 4,671,705 | Nussbaumer et al | 06/09/87 |
| 4,673,316 | Nussbaumer et al | 06/16/87 |
| 4,679,965 | Gläser et al | 07/14/87 |
| 4,697,953 | Nussbaumer et al | 10/06/87 |
| 4,741,644 | Cavelli et al | 05/03/88 |
| 4,753,551 | Brueggemann et al | 06/28/88 |
| 4,797,158 | Harriett | 01/10/89 |
| 4,808,039 | Fischer | 02/28/89 |
| 4,909,674 | Konno et al | 03/20/90 |
| 4,917,543 | Cole et al | 04/17/90 |
| 4,927,297 | Simpson | 05/22/90 |
| 4,929,126 | Steenbergen et al | 05/29/90 |
| 4,981,394 | McLaren et al | 01/01/91 |
| 4,993,880 | Collins | 02/19/91 |
| 5,013,185 | Taki | 05/07/91 |
| 5,096,334 | Plank | 03/27/92 |

The 718, '675, '758, '412, '039, '543 and '394 patents are considered to be more pertinent to the sealing aspects of the invention; the '827, '528, '921, '964, '365, '891, '028, '442, '260 and '334 patents are directed to various types of "trench boxes;" the '855, '612, '835, '861, '729, '536, '981, '705, '316, '965, '953, '644, '551, '158, '039, '297, '126, '880 and '185 patents are considered to be more pertinent to the over-all system of the invention; while the '102, '412 and '126 patents are considered to be more pertinent to various profiles used in various types of male/female joints used in a number of different items, some non-analogous to the present invention and all of which are significantly different from those used in the present invention, particularly those used in the interconnecting joints between the barrier members of the present invention.

With regard to "trench boxes", the prior art has contemplated numerous configurations for trench wall shoring devices and the like for preventing excavation cave-in, as evidenced by the sampling of patents noted above.

For example, U.S. Pat. No. 4,659,260 issued in 1987 for a "Trench Box" discloses a system to prevent the caving in of an excavated area, providing a reinforced shoring system. However, the guide box assembly of the present invention, which contemplates a slotted mechanism specifically configured for installing the barrier containment members of the present invention, teaches a mechanical installation system fully distinguishable from the '260 patent.

U.S. Pat. No. 4,090,364 to Nieber discloses a "Portal Frame for Trench Box Stack" wherein there is provided an easily assembled and disassembled system, but which nonetheless does not teach nor contemplate the mechanical aspects or template system or methodology of the present invention.

U.S. Pat No. 4,059,964 issued in 1977 discloses an opposed, support wall system for the installation of trench wall sheeting in side open areas in the wall system, which are positioned against the side walls of the excavation in which the trench wall sheeting is being installed. This system, while pertinent, is nonetheless fully distinguishable from the present system, as it does not teach nor contemplate the mechanical interrelationship or methodology of the present invention.

The other patents noted are likewise distinguishable from the present invention but are included to illustrate the state of the art. In summation, the guide box assembly system of the present invention does have substantial novelty with regard to the mechanical aspects of the invention as utilized in the installation of the barrier member containment system of the invention.

Most of the patents noted as being pertinent to the over-all system of the invention teach or contemplate a system for containing or preventing the lateral migration of fluids through the soil via fluid impermeable fabric or plastic sheeting subterranean structures or the like.

These patents typically rely upon a bentonite slurry or similar liquid means of preventing the caving in of the excavated area, and are thereby much more expensive to install when compared to the present invention. Further, these systems are distinguishable in their interlocking means for the various barrier members, which include systems which do not even contemplate a sealed connection along with the various joined members, substantially reducing, if not eliminating, any reliable containment of toxic fluid wastes.

With regard to the noted seal and the male/female profile patents, there is included various sealing means for panel members and other pertinent systems. For example, Cortlever U.S. Pat. No. 4,664,560 issued in 1987 teaches a subterranean containment system wherein there is provided (note FIG. 3) a heat activated seal for preventing the lateral migration of liquid therethrough. The system as taught is clearly distinguishable from a patentability standpoint.

U.S. Pat. No. 4,917,543 issued in 1990 teaches a "Wall System Employing Extruded Panel Selections" wherein there is taught a connector element (25) which may also act to seal the various installed panels. Again, however, this system is distinguishable from the present invention.

U.S. Pat. No. 3,302,412 issued in 1967 discloses a lug member 30 (note FIG. 2) configured to space the sheet piling into a proper interlocking installation. Also taught is the disposition of a sealant (36, FIG. 7) for preventing leakage of the system. Again, however, this is still just another profile and seal means which is clearly distinguishable from the present invention.

The Simpson '297 patent forms an impermeable barrier in an excavation made down to bedrock to contain waste materials in the ground, in which a sheet of impervious material, such as a fabric carrying a substantially dehydrated sodium bentonite clay, is placed along the side walls of the excavation, and the rest of the excavation is then filled with concrete.

The van Klinken '835 & '981 patents are directed to waste containment systems in which "more or less flexible sheets or foils" are introduced into the soil by means of a "lance".

In the Nussbaumer et al '953 patent a fluid sealing material is introduced through pipes into the ground which thereafter solidifies, sealing the wastes in a dump. The Brueggemann et al patent likewise uses a piping system to provide "a sealing screen for waste dumps". The Nussbaumer et al '316 patent uses slotted wall connections which must be flushed out prior to using plastic foil sealing elements for sealing two adjacent barrier wall sections.

In the Cavalli '644 patent initially vertically coupling members are formed in spaced bore holes in the ground, with the space between them excavated, and then a sandwich of high density polyethylene sheets with an internal mesh is connected between the coupling members, forming an "environmental cut-off and drain". In the Clark et al '729 patent a trench is made and a series of membrane fluid barriers are placed in it suspended between slotted end connectors.

The Konno et al '674 patent forms "an underground continuous water-impervious wall" by rolling out an impervious sheet of material into a trench and charging a hardening material against the opposite side surfaces of the impervious sheet and allowing the material to harden. In the Steenbergen et al patent a screen of flexible material is fed into a trench typically in a folded over fashion, with the top of the fold being held up by appropriate means in the untilled trench.

The Cortlever '560 patent, referred to above connection with seals, also discloses the use of dam wall sheets (1) of stainless steel of a synthetic resin which are sequentially inserted into the ground using an enclosing, vibrating, injection guide (19) aided by earth loosening water jets (29), with one sheet being vertically engaged with the preceding dam sheet via male/female edge joints which are slid together. After one dam sheet is inserted into the ground, the vibratory injection guide is withdrawn to then be used for the next dam sheet.

The presence of all of these diverse, attempted "solutions" of the past to the challenge of forming an impermeable barrier for intercepting a waste area and the prior existence for many years of the various means used in the present invention to successfully meet this challenge provide further objective indicia or evidence of the "unobviousness" and patentability of the invention.

GENERAL DISCUSSION OF INVENTION

The present invention overcomes the problems of the prior art by providing a barrier wall installation system which is reliable, relatively economical and less hazardous, which not only isolates and confines or restricts a contaminated area but also allows the controlled removal, collection, or treatment of fluids and other materials, including filtering or separation of particulate or liquid heavy metal suspensions.

As may be noted from the above, the prior art has not provided a relatively inexpensive yet consistently impermeable, readily implemented containment system for preventing the leaching of toxic materials from dump sites and the like. Nor does the prior art contemplate a satisfactory system for in situ treatment of such materials, including non-fluid particulates, removing them from the water supply.

However, such is achieved in the present invention, and the exemplary embodiments of the present system comprise the utilization of a single or plurality of barrier members, the barrier member providing a fluid impermeable barrier. Said barrier member can include edge appendages on the opposite or complementary ends of the barrier member, with the barrier members being installed and interconnected in an open work space in an excavation, protected by a series of interconnected guide box assemblies. At least one of the barrier members may include or have affixed thereto a pass-through module, through which fluids or other materials can be removed under controlled circumstances from the contained area for treatment, monitoring or containment.

As indicated, the barrier member may include appendages for connecting one to the other, and the barrier member appendages may be of a "male" and "female" type, respectively, and configured to slidingly engage and lockingly interconnected juxtaposed barrier members in a vertical fashion. Other, alternative means of connecting the barrier members may include welding, adhesives, zipper, clamping, riveting, fold mechanisms, and the like.

The only stipulation to the connection means is that the interlocking appendages should configured with each to include a fluid impermeable seal between the associated appendages of the interconnected barrier members.

It is noted that the appendages are not limited to a hundred and eighty (180) degree, planar separation and may be implemented in a variety of circumferentially located positions relative to one another. For example, a forty five (45, or twenty-two (22) degree separation would be used for a degree "catch" barrier system. Thus, the containment system need not necessarily form a circle or rectangle, and may be configured in any desired layout. It is noted that the engagement appendages for all interlocking configuration barrier members are designed to mate with the opposite appendages of other members of this invention.

The present invention of providing a vertical wall as a containment or catch barrier is possible as the wall is installed down to a depth to allow for the interception of, for example, an underlying clay strata in the soil, a fluid impermeable strata found at varying depths, or in the alternative, the water line when seeking to block somewhat lateral, subterranean flow of fluids having a lesser or neutral specific gravity than water. The system can even be configured to provide a means of interception, and thereby collection, of fluids and particulates having a greater specific gravity of water, if adequate information on the underwater migration of the water table is known and within certain perimeters. Thus, various sites require different depths of implementation utilizing differing member lengths.

Normally it is not necessary to go deeper than forty (40') feet, and, thus, conventional excavation equipment typically may be used in the present system.

For installation of the present invention particularly in soil conditions having a likelihood of "caving", the present invention teaches the implementation of a "guide box" template or guide box assembly system, into which the barrier members are placed and interconnected, extending the full depth and ultimately the full length of the excavation. The "guide box" serves at least five purposes, namely: (1) it provides an outer support structure which prevents any caving walls of the excavation from entering the area where the members are to be installed, lessening the likelihood of complications during engagement of the barrier members; (2) it provides a template for easy engagement and proper alignment of the barrier members during installation; (3) it provides protection for previously installed barriers against damage from the excavation equipment (when an trench or guide box is desirable); (4) it can act as a guide for the excavation equipment excavation, if auguring is used; and (5) it can allow for gradual and controlled back-filling by being slowly extracted from the excavation, if so desired. However, the first two purposes are the primary purposes of the guide box assemblies of the invention.

In the preferred embodiment of the present invention, the guide box allows for the rolling of the barrier sheeting in generally horizontal fashion along the excavation, supporting the roll while guiding said roll or sheeting along a protected work area.

Also, each guide box assembly may include two spaced wall panels providing the protected, open work space for the barrier member installation between them, which wall panels can be easily assembled into a rigid unit by means of a series of laterally extending, top and bottom spreader bars. The lower or bottom spreader bars, which preferably can also serve as anchors for the guide box assemblies and bases for the barrier members, are easily detached and left down in the ground when the wall panels are removed from the excavation. This is achieved by the use of a series of vertical, parallel, guide shafts extending through the full height of the wall panels, connected at their tops to the top of their respective wall panels and temporarily connected at their bottoms to the anchoring spreader bars by means of rotatable interconnections, which can be easily reversed to detach the bottom spreader bars from the wall panels.

In the preferred embodiment of the present invention, a pass through module is provided which includes the pass through, collection tank and piping, and, where desired, in-situ treatment equipment. Said pass through module may also have provided therein first and second barrier rolls for facilitating installation of the barriers, as well as trench or guide box connection means for facilitating connections to the trench or guide boxes for installation of said barrier rolls.

In an alternative embodiment, at least one of the guide box assemblies may also include pass-through areas, through which access to the pass-through in the guide box's associated barrier member is possible. A typical, completed pass-through will include one or more pipe sections feeding through or otherwise communicating with, for example, an integral, flanged pass-through in the barrier member. The guide box assembly with its pass-through areas is preferably left "permanently" in the ground, rather than removed like the other guide box assemblies.

The leaving in the ground of the pass-through guide box assembly helps to strengthen and secure the pass-through of the associated barrier member. However, after the site has been processed and cleaned up and the pass-throughs and barrier walls are no longer needed, they likewise can then be removed, if so desired, returning the site to its natural state. The pass-through may include suction means for providing a low pressure area given for urging the fluid to be contained to the pass-through.

The present system contemplates excavation of the ground soil via trenching or auguring, but expressly teaches that other methods of excavation may be utilized with satisfactory results.

It is therefore an object of the present invention to provide a system for containing hazardous wastes, which is efficient, utilitarian, cost effective, and which provides reliable protection against the threat of migrating contamination of adjacent aquifers and soil and also allows the controlled removal or treatment of contaminated material from the contained or restricted area.

It is a further object of the present invention to provide a system for preventing the lateral migration hazardous wastes beyond an established perimeter, which utilizes a plurality of slidingly engaged interlocking containment members which are installed in a protected, open work space provided by a series of interconnected guide box assemblies, at least one of which preferably includes co-operative pass-through areas.

It is a still further object of the present invention to provide a system for intercepting the lateral flow of hazardous wastes through the ground, that is adaptable to a variety of dump site configurations.

It is another object of the present invention to provide a system for interception of hazardous wastes which provides an economical and effective procedure.

It is another object of the present invention to provide a system for containing hazardous wastes while allowing the wastes to be removed or neutralized or treated in situ, as desired.

It is a further object of the present invention to provide a method of installing a hazardous waste containment system utilizing a plurality of vertical barrier members, wherein the method includes the utilization of a "guide box" template or assembly which aids in the installation process, in which at least one of the barrier members includes an integral pass-through for one or more pipes for the controlled removal of, for example, heavy metals, or treatment of the hazardous wastes on site.

It is still a further object to provide a protected satellite area or cell adjacent to the contained area for use as an on-going work and equipment area for equipment and the like to remove by pumping or suctioning the hazardous materials from the contained hazardous waste area and, if so desired, at least preliminary treating the waste materials on-site in the satellite area.

It is further corollary object to build such a protected satellite area or cell using the same or similar types of guide box assemblies and barrier members and associated methodology as used to build the containment or restriction system.

It is another object of the present invention to provide a one piece, prefabricated pass-through module which provides the capability of intercepting a waste plume in the ground, collecting said plume, removing the toxins therefrom, and releasing the treated, unpolluted liquid back into the ground.

Lastly, it is an object of the present invention to provide a system for intercepting the lateral migration of hazardous wastes, preventing further contamination of the soil or ground water, utilizing a rolled barrier system.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1C is a side, partially cross-sectional, partially cut-away view of the embodiment of FIG. 1B, illustrating the wing wall collection members and utilization of suction through the pass-through provide a low pressure area, drawing the hazardous waste plume to the collection area.

FIG. 1D is a side, partially cross-sectional, partially cut-away view of the embodiment of FIG. 1C, but teaching an in-situ treatment arrangement, as opposed to the FIG. 1C ex-situ treatment system.

FIGS. 2 and 2a–2b illustrate an upper, cross-sectional view of the system of FIG. 1C, illustrating the migration of the plume with the water table to the collection site, as well as the rolled barrier installation of the wing walls.

FIG. 5A is a side view of the preferred embodiment of FIG. 5, illustrating the operation of the unfurling mechanism of the trench or guide box.

DETAILED DESCRIPTION OF THE INVENTION

Figure 1A:
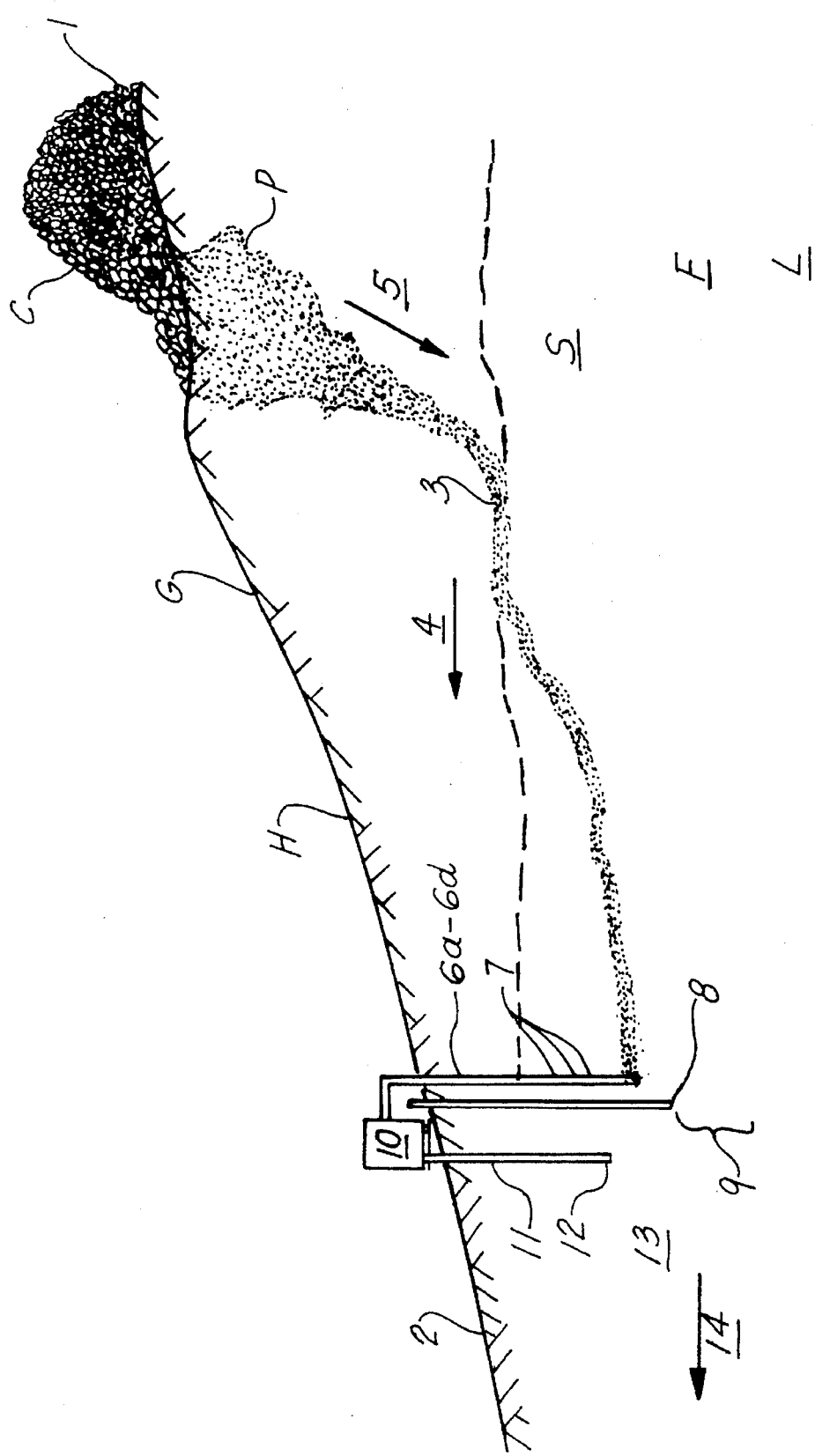
FIG. 1A is a side, cross-sectional view of the an embodiment of the barrier system of the present invention, illustrating, as an example of the use of the present system, a hazardous waste plume suspended in the water table being intercepted, collected, and treated ex situ.

As can be seen in FIG. 1A, the present invention comprises a system for intercepting, collecting and processing subterranean hazardous waste in the form of a fluid or suspension.

As shown, the placement of the present collection/barrier system is dependent upon the terrain and composition of the area to be implemented. In the area of FIG. 1A, there is illustrated, as an example, a ground area having a rise 1, and a lower area 2 below the rise, forming a hill H. As shown, an exemplary waste dump C or the like is illustrated at the top of the rise, where hazardous fluids and particulates are leaching therefrom in the form of a plume P into the ground G.

The plume P is drawn by gravity through the ground, downward until intersecting 3 with saturation area S, in this example, comprising the water table, where the ground is saturated with naturally occurring water. After intersecting with the water table, the plumes rate of descent through the ground is altered due to the change in composition of the area traversed, particularly due to the saturation and the specific gravity of the water therein. Further, the path of the exemplary plume is altered due to the naturally occurring flow F of the water table in the saturation area S. As shown, the plume is directed in a new, more horizontal flow path, 4 generally aligned with the natural groundwater or water table flow F, by said flow F.

The present invention comprises placing a barrier wall 8 or the like at a depth and location to allow for the interception of the plume, coupled with a means to collect or monitor the plume, which may take the form of a generally laterally situated collection pipe or pipes 6a–6d having collection apertures 7 for collecting the plume contents.

As further shown, the hazardous waste forming the plume, once collected by the collection pipe or pipes 6a–6d, may be processed 10 in-situ or ex-situ, so as to remove the hazardous materials or fluids therein, and return treated, residual groundwater 12 into the ground behind the barrier 13 via outflow/release pipe 11 or the like, where said treated, residual groundwater is returned to the water table and drawn away from the area via groundwater current 14.

An advantage of the present system is that, by intercepting the plume, in its path, at any depth within the plume, one need not install the barrier to a depth intersecting with the fluid impermeable, clay strata L, which can run sixty feet or much deeper under the ground, and which would, in many situations, be far too costly.

With the present, exemplary illustration of FIG. 1a, the base of barrier wall needs to be at a greater depth than the anticipated plume depth at the area to be intercepted; thereby leaving an open area 9 between the base of the barrier wall 8 and the fluid impermeable strata L, wherein the uncontaminated groundwater table flow can pass thereunder.

Figure 1B:
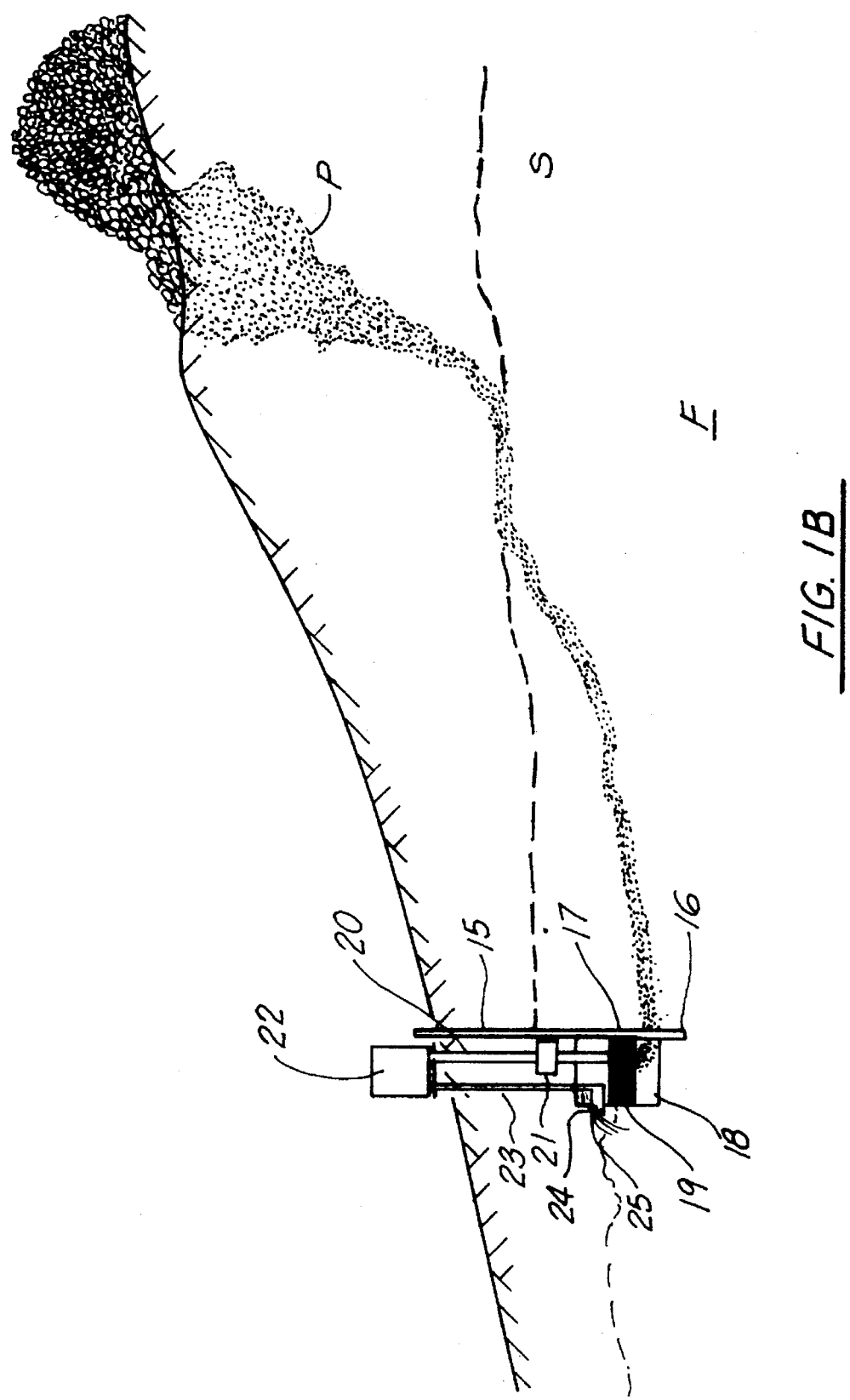
FIG. 1B is a side, cross-sectional view of the preferred embodiment of the barrier system of the present invention, illustrating a hazardous waste plume suspended in the water table being intercepted, collected, and treated ex situ via a pass through system.

FIG. 1B illustrates a preferred embodiment of the present invention utilizing the pass-through 17 port situated in the barrier wall 15 so as to intercept the plume P as it is directed by the flow F of the saturation S area. As shown, the pass through 17 is configured to collect and direct the plume P through the barrier wall 15, collecting of waste in the plume in a waste sump tank 18 for collection and/or further processing. As shown, the collected waste 19 is directed through a sump removal pipe 20 via suction/removal pump 21, to an ex situ collection/treatment module 22, wherein the collected waste is stored, or treated, with the treated groundwater 25 returned to the ground via infusion pipe 23, and the outlet port 24.

FIG. 1C illustrates the utilization of a suction means such as a pump 30 or the like in conjunction with the pass through collection port 31 to generate a low pressure area L, in order to direct the plume P in a direction 26 generally toward the collection port 31, so that said plume does not flow in the open area 29 beneath the barrier wall 27. As shown, angled side wing 28 can be utilized on both sides of the collection area to form a collection basin, facilitating better collection of the plume.

FIG. 1D illustrates an in situ treatment plant version of the invention of FIG. 1C, wherein the collected waste from the plume is collected from the sump tank via intake pipe 33, wherein it is processed underground in the in situ collection/ treatment module 32, and the treated, residual groundwater 35 is released via the release or outflow pipe 34; the collection/treatment module may be serviced via a cell 37, 37' or silo running to the surface, providing access.

Figure 2:
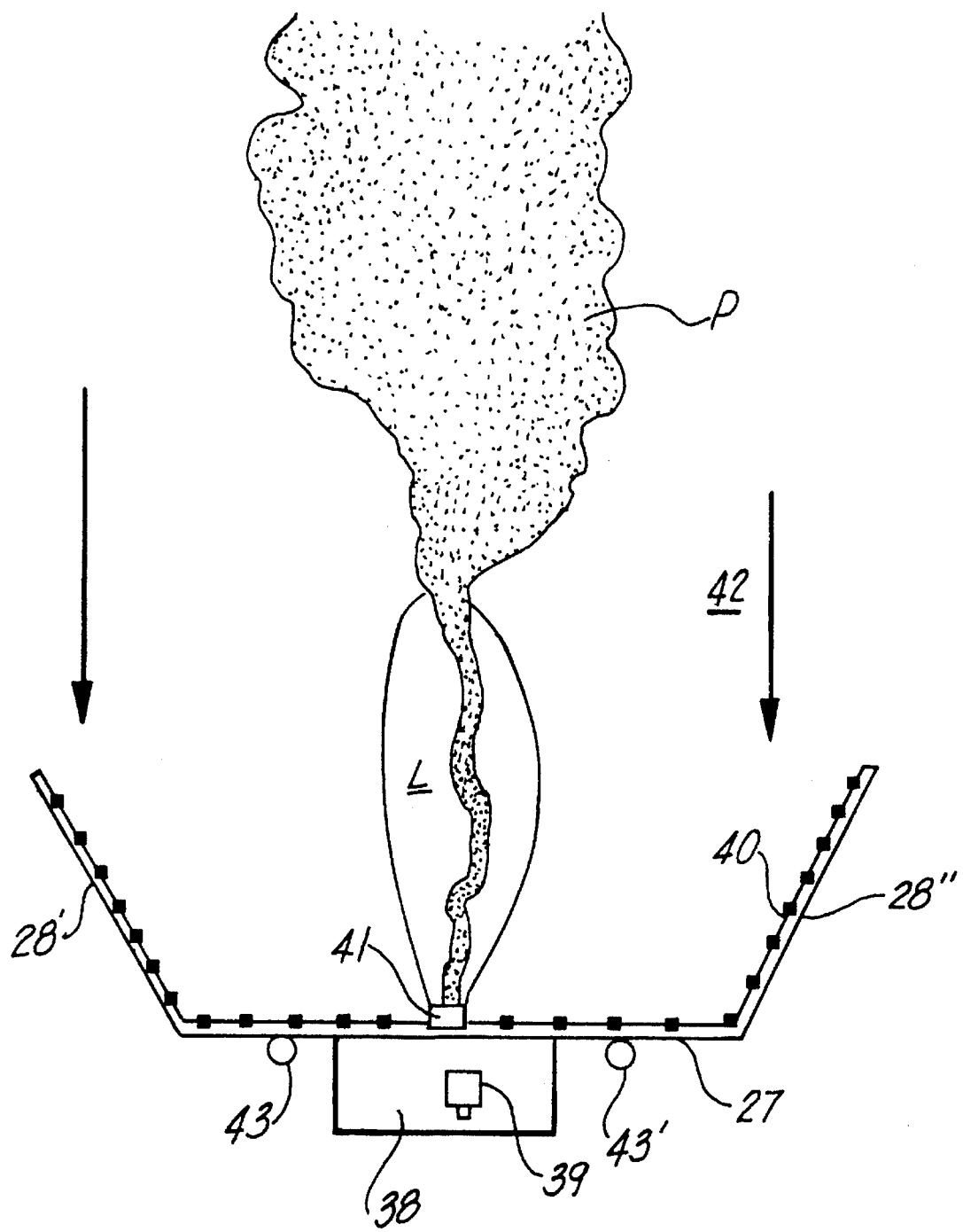

FIG. 2 illustrates a top view of the preferred embodiment of the present invention, illustrating the collection and processing of the plume P. In this version of the invention, the barrier wall 27 includes first 28' and second 28" angled wing walls, forming a collection basin or funnel effect. Situated along the barrier wall 27 is perforated, generally horizontally situated collection piping, for facilitating remote collection of the plume P via the pass through port 41.

As indicated in the discussion of the invention above, the plume P is driven toward the collection area via the natural flow thereof, or the flow of the groundwater 42 which it may have interfaced and, once in contact with the established low pressure area L created by the suction from the pass through port 41, said plume is directed to said pass through port, and into the sump tank 38, wherein it is pumped via pump 39 through a collection/treatment module.

The present invention may include generally vertically situated monitoring/collection pipes 43, 43' or the like situated behind or down gradient of the barrier wall relative the pass through so as to monitor the effectiveness of the collection system in containing the plume.

Figure 2B:
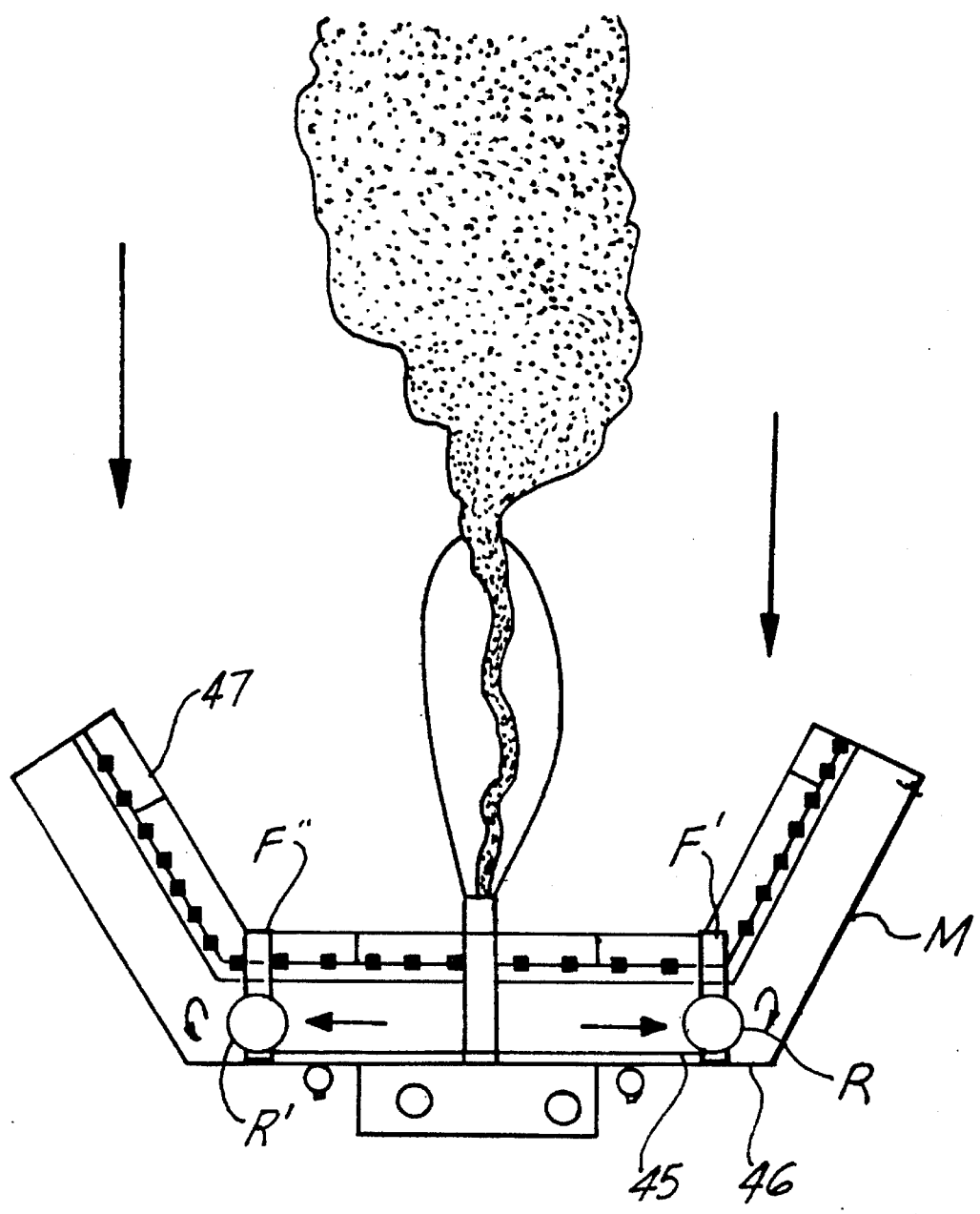

FIGS. 2a and 2b illustrate an embodiment of the present invention particularly suitable for use in conjunction with a fluid impermeable sheeting, such as, for example, 4–100 mil HDPE or the like. As shown in FIG. 2A, the system comprises a pass-through module M having a rear wall 46 and a forward wall 47, with a an open area 53 therebetween.

The pass-through module M may be pre-fabricated and installed as a one piece construction at the installation site, greatly simplifying installation of the system. After excavating a main trench area for the pass-through module M, trenches are excavated for placement of the barrier wall member emanating from the module M, which may include the step of providing guide boxes in the excavation to support the side walls from caving, and to allow for the installation of the barrier wing walls or the like.

As shown, the barrier wall 45 passes through the open area 53 of the module M, although it could be affixed to the ends of the inner 46 or outer 47 walls, extending and widening the collection area as desired. Also shown are horizontal collection pipes 48 having collection apertures 49, said collection pipes interfacing with the pass-through pipe 50, facilitating collection of the plume contaminants which may have escaped the main collection area. A filtration medium such as silica sand or the like may be provided before the front wall, in the vicinity of the pass-through pipe 50 and other collection pipes 48 and apertures 49.

Although the horizontal collection pipes 48 are illustrated as being situated in the open area 53 between the rear 46 and front 47 walls, they may be located in front of the front wall 47, or behind the rear wall 47, and may comprise a single pipe, depending upon the circumstances of use and desired effect. Also, there may be provided rearly situated lateral collection monitoring pipes 52, 52', for verifying the effectiveness of the collection/containment.

The sump tank 51A may be situated to the front of (and attached to) the front wall 47, or may be located in the open area 53 between the rear 46 and front 47 walls, as desired, to form the one piece module M. A rearly situated treatment module 51 may be situated to the rear of the collection area.

FIG. 2b illustrates a method by which the barrier wall 45 may be installed in the present system, utilizing a single, unitary, prefabricated, pass through module including a barrier wall installation means therein.

As shown, the module of the present invention includes rolls R, R' of fluid impermeable sheeting or film, such as, for example, 4–100 mil HDPE or the like, although sheeting of various densities should work equally as well, depending upon the application. In use, a roll of such barrier sheeting is generally vertically aligned on frames F', F" designed to slidingly ride or be supported via cherry picker or the like just above the upper periphery or top edges of the pass through module M frames front 47 and rear 46 walls, as well as the upper edges of the trench or guide boxes when installing the barrier sheeting to form adjacent barriers, such as wing walls or the like.

In one example of the dispensing of the rolled barrier sheeting, the sheeting or film is affixed, for example, to the central, rear area of the module, and the rolls are moved via the sliding frames away from each other, such that said rolls are rotated along their longitudinal axis, dispensing the fluid impermeable sheeting or film as they are slid apart, thereby forming a generally vertically situated, horizontally dispensed barrier wall.

The pass through can also penetrate the barrier material at any point in the barrier wall, where a pass through is located. The pass through can also be installed at the beginning of a roll of material and with an interlock or other fluid impermeable joining means, a second roll can be installed by joining with one end of the first installed roll. Subsequent rolls can likewise be similarly installed, effectively allowing for a barrier of unlimited length.

Trench or guide boxes may be thereby affixed to the ends of said front and rear walls forming the pass-through module M, so as to allow for the further extension of said walls, via allowing said frames F', F" to slide along said trench or guide box extension(s), further extending said barrier walls. Said rolls may be provided in the pass through module as prefabricated for on-site installation, with the installation on site only comprising the excavation, and the providing the module, and desired trench or guide boxes for the installation, the module including the pass through, collection tank and equipment, as well as the barrier roll members for facilitating the collection or catch basin/containment or funnel area.

Figure 3:
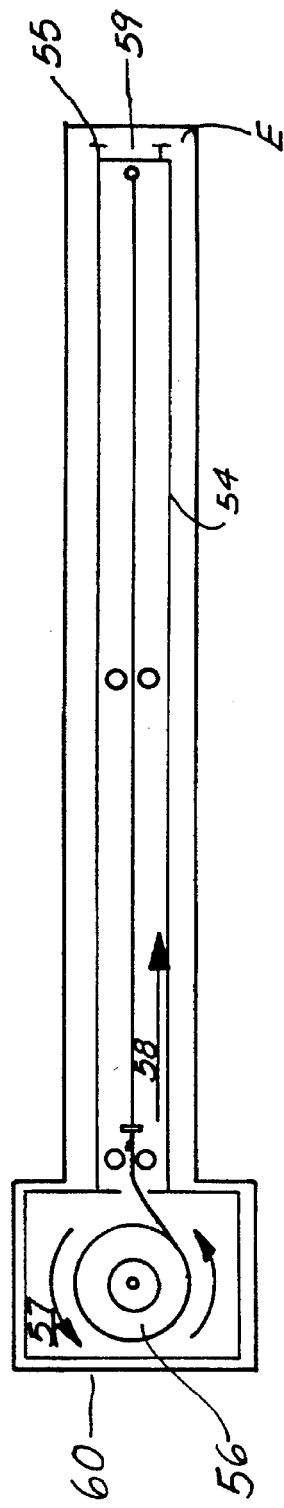
FIG. 3 is a top view of an exemplary trench or guide box of the present invention, including a barrier roll support for dispensing barrier sheeting in longitudinal alignment with the trench or guide box.

FIG. 3 illustrates a top view of an alternative trench or guide box which may be utilized with the pass through module of the present invention for facilitating installation of the barrier wall. As shown, the trench or guide box is shown in an excavation E, the trench or guide box 54 including first 60 and second 59 ends, the first end including a roller containment area including a rolled barrier 56 mounted upon a frame for rotational dispensing 57, via the directing of said barrier from said first end of said trench or guide box towards 58 and past said second end of said trench or guide box, rotating said roll and dispensing said barrier wall along the length of the trench or guide box, as well as any adjoining guide pr trench or guide boxes via connecting slots 55 or the like, as desired.

Figure 4:
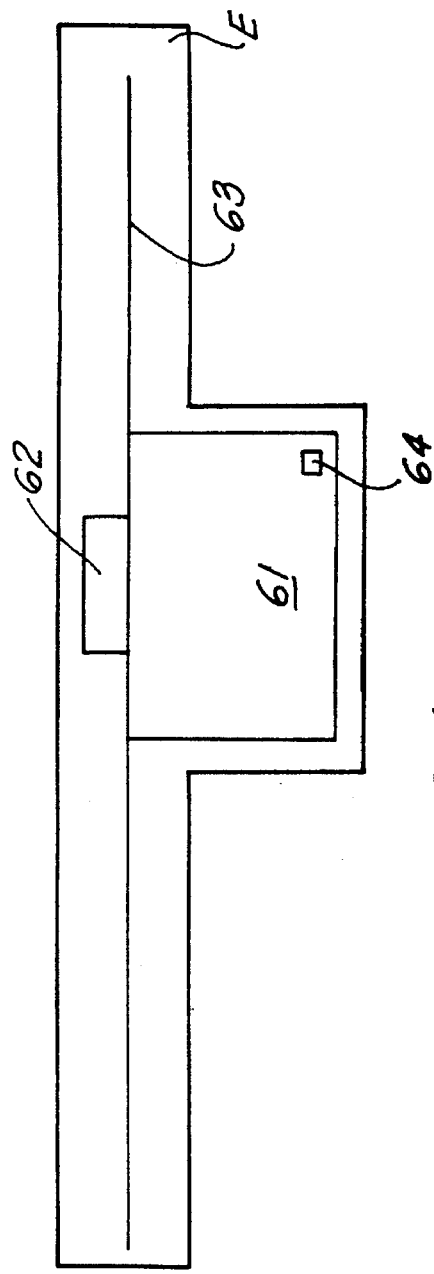
FIG. 4 is a top view of a pass through system as may be used in the invention of FIGS. 1B or 1C, installed in an exemplary excavation.

FIG. 4 illustrates an excavation E containing a simple alternative prefabrication of the pass through of the present invention, including a wall member 63 having affixed thereto a sump tank 61 having a pass through 62 in communication therewith, the pass through formed through the wall member, the sump tank further including a waste removal/monitoring pipe 64. The system is shown from a top view, installed in an exemplary excavation.

Figure 5:
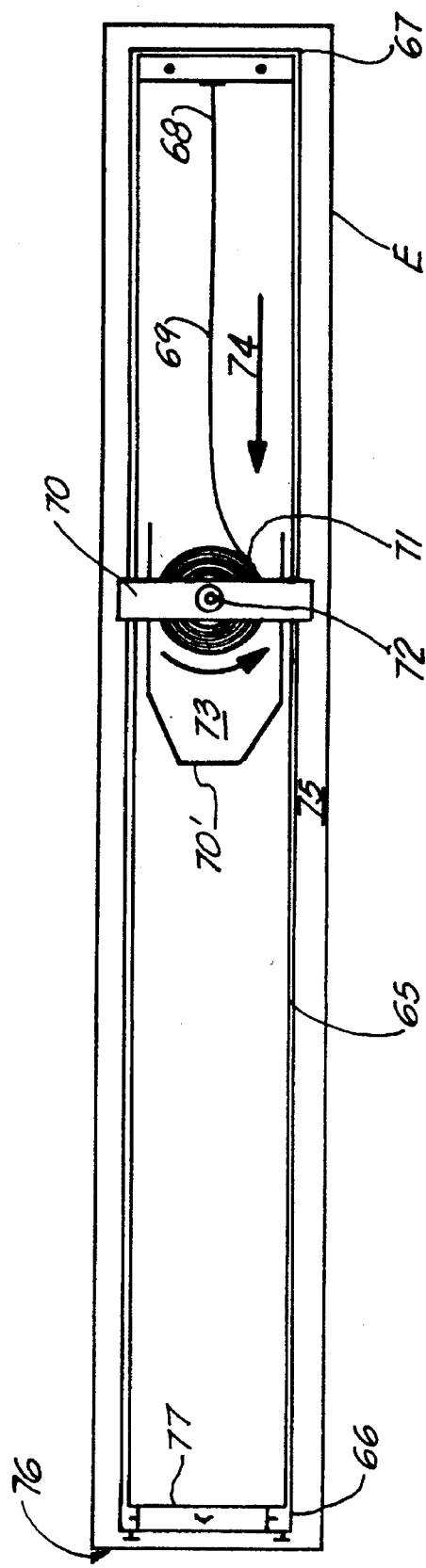
FIG. 5 is a top view of the preferred embodiment of the trench or guide box used in the system of the present invention, illustrating the unrolling of the barrier sheet in the excavation.

FIGS. 5 and 5A illustrate an exemplary trench or guide box 65 which may be utilized to prevent caving of an excavation for installation of a rolled barrier member, and which may be joined at its end via sliding engagement or the like with, for example, the pass through module of FIGS. 2a and 2b, to form a fluid impermeable seal.

Returning to FIG. 5, the trench or guide box 65 is shown from a top view in an excavation made to the desired installation depth. As shown in FIGS. 5 and 5A, the trench or guide box 65 includes first 67 and second 66 end gates, and further having an upper support bars 75 forming an upper edge. Resting on the upper edge formed by support bars 75 is a roller frame 70, supporting a roll 71 of fluid impermeable barrier sheeting, or the like via rotatable axle 72 longitudinally aligned with said roll 71.

In use, the path of the plume through the area must be determined, discerning the depth and extent of migration. Then, the optimal area to intercept said plume is determined, taking into consideration the depth of the plume, and the general lateral extent of the plume and concentration. Ideally, the plume should, at its intersect or collection area, not be too widespread, so as to provide an economy in the size and depth of the containment barrier and, where desired, collection system.

Next, an excavation is made in the ground to the desired depth to contain or intersect the plume; an exemplary excavation depth could be, as an example, 30 feet. The pass through module is then installed in said excavation in the general vicinity of said plume; the barrier wall would be of sufficient width and depth to allow for the interception of the plume, containing it or providing adequate containment for collection via the pass through or other collection means, such as a suction pipe or the like. In the present example, plume intersection with the excavation would occur at, for example, 20 feet; therefore, 30 foot barrier walls would extend ideally ten feet below the plume intersection in this embodiment, so as to provide some degree of assurance as to the containment of said plume.

Once the pass through module is in place, guide boxes are utilized to facilitate installation of the barrier wall beyond the area of the pass through. If a rolled barrier is utilized, the trench or guide box would be engaged to the pass through module so as to allow continued sliding passage of the rolled barrier member from the pass through module, through and along the guide boxes, sliding the roller frame along or just above the trench or guide box, thereby rotating the roll, and dispensing the rolled barrier member along the length of the excavation, wherein guide boxes are provided.

Another guide box can be joined to the free end of the first installed guide box, and the barrier member roll likewise dispensed in similar fashion along the length of the newly installed, joined guide box, at which point another guide box can be attached at the free end, and so on, until the barrier member is installed to its desired length. Only two guide boxes would be needed for the operation, as the first guide box could be removed once the rolled barrier member has been dispensed therein, and the roll has been placed upon the second guide box, at which time the first guide box is removed and may be joined with the second, unattached end of the second guide box, to as to facilitate further installation of the rolled barrier member, and so on, until the barrier sheet is dispensed throughout the excavation; likewise, the process can be repeated to form a barrier on the opposing side of the pass-through area.

If a rigid barrier member is utilized in place of the sheet barrier, then the system of U.S. Pat. Nos. 5,240,348, 5,106, 233, 5,354,149, or patent application Ser. No. 07/986,241 may be utilized for installing the barrier wall; the content of all of the above referenced patents and applications is incorporated herein by reference.

FIG. 5a, further illustrates the preferred means of installing the barrier sheet member in the excavation, from a roll of barrier sheeting. As shown, in beginning the installation of a wall in such a case, the end of the rolled barrier member 69 is anchored utilizing, for example, end support rod 68 or the like to, for example, the first end 67 of the guide box. The roll 71 is then directed to the second end 66 or the guide box via sliding or lifting via padeye 72' utilizing a cherry picker or crane, and maneuvering the roller frame 70 towards 74 the second end 66: because the end of the rolled barrier member is anchored, the roll 71 must rotate 73 about its longitudinal axis as the roller frame 70 is moved, thereby dispensing the wall along the length of the trench or guide box. A second trench or guide box may be attached via sliding engagement at its end via connection slots 76, and the process may be repeated until the excavation has fully dispensed therein the sheet barrier. End sliding barriers 77 may be provided to keep the dirt out during installation of the trench or guide box into the ground and joining of same with a second trench or guide box, at which time the barriers 77 may be lifted from the trench box, providing an open passage for the roller and barrier.

Referring to FIGS. 5 and 5A, a dispenser cover 70' may be provided to protect the roll 71 to be dispensed, the cover 70' having first and second ends, the first end communicating with the upper roller frame 70, the second, lower end having affixed thereto the lower roller frame 70", forming a dispenser shell. As shown in FIG. 5, the forward area of the frame may be more narrow than the width about the roller to facilitate easier forward movement of the system during dispensing of the sheet material from the roll. The shell.

Figure 6:
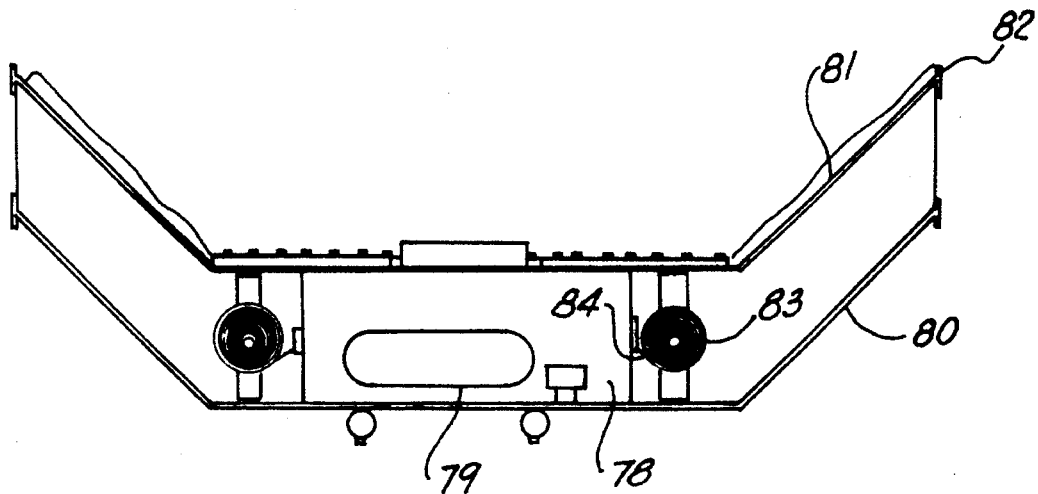
FIG. 6 illustrates a top view of an alternative embodiment of the present invention, illustrating a pass-through module having the sump/collection tank juxtaposed the rear and front walls.
Figure 7:
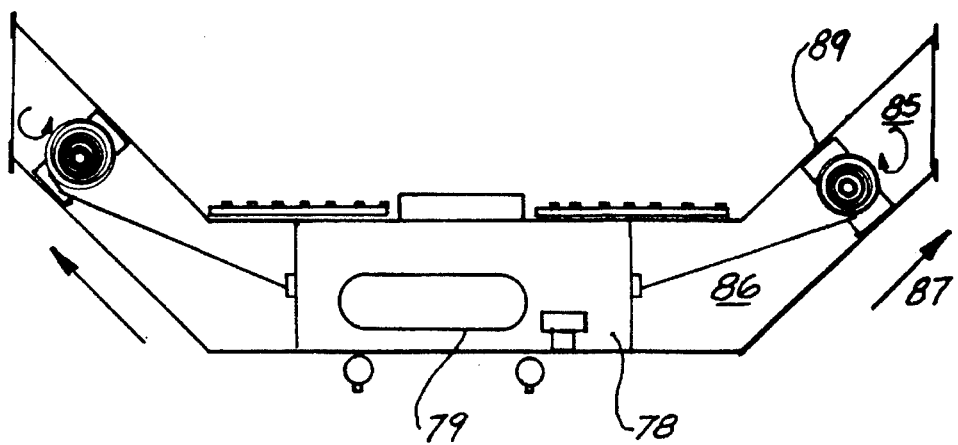
FIG. 7 illustrates a top view of the invention of FIG. 6, illustrating a pass-through module having the sump/collection tank juxtaposed the rear and front walls, and further illustrating the installation of the rolled barrier, disbursing the sheet barrier member.

FIGS. 6 and 7 illustrate an alternative construction of the pass through module of the present invention, wherein the sump tank 78 including the optional pump/filtering unit 79 mounted between the rear 80 and forward 81 walls, the module further having provided therein first and second rolls 83 of barrier sheeting 86, attached 84 at their end to sump tank 78. As shown in FIG. 7, the barrier wall may be installed in the manner discussed in FIG. 5 and 5A; returning to FIG. 7, the dispenser or roller frame 89 is directed 87 away from the sump tank, causing the roll to rotate 85 about its longitudinal axis, and dispensing the barrier wall 86; further the trench or guide box of FIGS. 5 and 5A may be slidingly engaged to the ends of the module, via, for example engagement slots 82, to facilitate further dispensing of said barrier roll in a manner consistent with the above, the trench or guide boxes allowing the continued direction of the roll away from the module, and the rotation and dispensing of the wall with said action.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

I claim:

1. A method of intercepting and collecting a subterranean plume of contaminants migrating through ground along a path, comprising the steps of:
   a. determining the path of migration of said plume through the ground;
   b. making an excavation in the vicinity of said plume, of an extent and depth to allow for the interception of said plume:
   c. forming a fluid impermeable barrier in the ground intersecting said plume, including the sub-steps of:
      i. placing a first guide box assembly, having at least one longitudinal slot formed therein of a depth sufficient to accommodate a barrier member in the excavation;
      ii. placing a subsequent series of guide box assemblies in the excavation adjacent to a preceding one of said guide box assemblies, each guide box assembly having at least one longitudinal slot formed therein of a depth sufficient to accommodate a barrier member, said guide box assemblies being placed in the excavation with the exterior side walls of the guide box assemblies being spaced from the side walls of the excavation, the interiors of said guide box assemblies providing a temporary, open, protected work space for the insertion and assembly of a barrier in the longitudinal slots of respective ones of said guide box assemblies;
      iii. providing a barrier member in the longitudinal slot of said first guide box assembly; and
      iv. providing said barrier in the longitudinal slots formed in said subsequent series of guide box assemblies in the excavation adjacent to said preceding one of said guide box assemblies, forming a fluid impermeable barrier in the ground, allowing for the interception of said plume, thereby blocking the further lateral migration of said plume;
   d. filling the excavation; and
   e. removing at least a portion of said guide box assemblies from the excavation.

2. The method of claim 1, wherein said barrier comprises a fluid impermeable sheet.

3. The method of claim 2, wherein said fluid impermeable sheet comprises high density polyethylene, and is from 4 to 100 millimeters in thickness.

4. The method of claim 1, wherein step c, sub-steps iii and iv further comprise the step of providing a roll of fluid impermeable sheet for forming a barrier, positioning said roll in a general vertical position within the longitudinal slot of said first guide box assembly, and unrolling said roll so as to provide said fluid impermeable barrier along the length of said longitudinal slot, and continuing to unroll said roll, providing said barrier along the length of the longitudinal slots formed in said subsequent series of guide box assemblies in the excavation adjacent to said preceding one of said guide box assemblies, forming a fluid impermeable barrier in the ground to allow for the interception with said plume.

5. The method of claim 1, wherein there is further included in step "c" the additional step of providing collection means for collecting said plume in the general vicinity of said barrier.

6. The method of claim 5, wherein said collection means further comprises filtering means for filtering said plume collected by said collection means.

7. The method of claim 5, wherein there is further provided monitoring means for monitoring the containment of said plume and the integrity of said barrier.

8. The method of claim 5, where said collection means further comprises suction means for providing a low pressure area in the vicinity of the collection area, drawing said plume into said collection area, thereby facilitating collection of said plume.

9. The method of claim 6, wherein said filtering means is in-situ.

10. The method of claim 5, wherein there is further included the steps of providing a pass through module for collection of said plume, said pass-through module in communication with said barrier, said pass-through module further comprising a forward wall having formed therethrough a pass-through port, said pass through port having an open end situated forward of said forward wall, in the general vicinity of said plume, said pass-through module further comprising a collection tank, said collection tank in communication with said pass-through port.

11. The method of claim 10, wherein said pass-through module further includes a rear wall to the rear of said forward wall, forming an open area therebetween, and wherein said open area is configured to accept passage therethrough of a roll of said sheet barrier, and wherein said pass-through module further comprises monitoring means for monitoring the containment of said plume and the integrity of said barrier.

12. The method of claim 11, wherein said collection tank has situated in conjunction therewith suction means for facilitating collection of said plume through said pass-through port, filtration means for filtering contaminants from said plume, and infusion means for providing the filtered, uncontaminated water collected through said pass-through port back into the ground.

13. The method of claim 10, wherein said pass-through module further includes a generally horizontally collection pipe situated in generally parallel fashion relative to said front wall, said collection pipe further including a series of collection apertures formed therein for collecting said plume, said collection pipe communicating with said collection tank.

14. The method of claim 4, wherein said roll is situated in a dispenser shell.

* * * * *